United States Patent
Needelman et al.

(10) Patent No.: US 7,062,363 B2
(45) Date of Patent: Jun. 13, 2006

(54) REFINEMENT OF SPACECRAFT ANGULAR VELOCITY AND ATTITUDE ESTIMATES USING STAR DATA

(75) Inventors: David D. Needelman, Torrance, CA (US); Rongsheng Li, Hacienda Heights, CA (US); Yeong-Wei A. Wu, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 10/945,671

(22) Filed: Sep. 21, 2004

(65) Prior Publication Data

US 2005/0071055 A1 Mar. 31, 2005

Related U.S. Application Data

(60) Provisional application No. 60/507,315, filed on Sep. 30, 2003.

(51) Int. Cl.
*G01C 21/02* (2006.01)

(52) U.S. Cl. ............................. 701/13; 701/222; 701/3; 244/164; 455/12.1

(58) Field of Classification Search .................. 701/13, 701/222, 3, 4; 342/352, 357.02, 352.04, 342/357.06, 457; 244/159.4, 171, 164; 455/12.1
See application file for complete search history.

(56) References Cited

U.S. PATENT DOCUMENTS

| | | | |
|---|---|---|---|
| 5,020,744 A | 6/1991 | Schwarzchild | 244/164 |
| 5,255,879 A | 10/1993 | Yocum | 244/171 |
| 5,412,574 A | 5/1995 | Bender | 364/455 |
| 5,508,932 A | 4/1996 | Achkar et al. | 244/171 |
| 5,597,142 A | 1/1997 | Leung | 244/164 |
| 5,745,869 A | 4/1998 | van Dezooijca | 701/222 |
| 5,826,828 A | 10/1998 | Fowell et al. | 244/164 |
| 5,865,402 A | 2/1999 | Fischer | 244/166 |
| 5,919,314 A | 7/1999 | Kim | 244/173 |
| 6,019,320 A | 2/2000 | Shah et al. | 244/171 |
| 6,266,585 B1 * | 7/2001 | Mazzini | 701/13 |
| 6,266,616 B1 | 7/2001 | Needelman | 244/171 |
| 6,463,366 B1 * | 10/2002 | Kinashi et al. | 701/13 |
| 6,470,270 B1 | 10/2002 | Needelman et al. | 244/171 |
| 6,512,979 B1 | 1/2003 | Needelman et al. | 244/171 |
| 6,588,708 B1 | 7/2003 | Wang et al. | 244/164 |
| 6,691,033 B1 * | 2/2004 | Li et al. | 701/222 |
| 6,945,500 B1 * | 9/2005 | Wingo | 244/159.4 |

* cited by examiner

Primary Examiner—Matthew Luu
Assistant Examiner—Tuan C To
(74) Attorney, Agent, or Firm—Gates & Cooper LLP

(57) ABSTRACT

A method and apparatus for refining a spacecraft state estimate, such as an attitude estimate or an angular velocity estimate, is disclosed. The method computes a plurality equations using residuals describing the difference between observed star positions and predicted positions based on inertial measurements, and solves those equations to generate refined estimates of the spacecraft state estimates.

32 Claims, 6 Drawing Sheets

REFINEMENT OF SPACECRAFT ANGULAR VELOCITY AND ATTITUDE ESTIMATES USING STAR DATA

CROSS-REFERENCE TO RELATED APPLICATIONS

This application claims benefit of U.S. Provisional Patent Application No. 60/507,315, entitled "REFINEMENT OF ANGULAR VELOCITY BIAS AND ATTITUDE ESTIMATES USING STAR DATA," by David D. Needelman, Rongsheng Li, and Yeong-Wei A. Wu, filed Sep. 30, 2003, which application is hereby incorporated by reference herein.

BACKGROUND OF THE INVENTION

1. Field of the Invention

The present invention relates to systems and methods for guidance and navigation of spacecraft and in particular to a system and method for refining the attitude and angular velocity estimates of a spacecraft.

2. Description of the Related Art

Spacecraft typically have one or more payloads that are directed to transmit or receive energy from ground stations. For example, communication satellites include one or more uplink antennae for receiving information from an uplink center, and one or more downlink antennae for transmitting information to a terrestrial receiver. The uplink and downlink antennae are typically disposed on the satellite body (or spacecraft bus) and are directed toward a terrestrial location where an uplink/downlink antenna is transmitting/receiving the information.

In order to perform their intended functions, the attitude of such satellites must be accurately determined and controlled. Advanced satellite systems typically require attitude determination and control under more demanding circumstances and with greater accuracy. Such advanced satellite systems may be required to perform attitude determination under adverse conditions (e.g. while the satellite is experiencing rapid attitude changes and/or in high radiation environments), and in response to a loss of an attitude estimate, may be asked to perform an attitude determination autonomously. While methods exist to recover attitude estimates, the accuracy of the estimate obtained may not be sufficient to meet system requirements. Furthermore, the attitude estimate obtained must be updated as the satellite moves; this requires the systems to also estimate satellite angular velocity, with respect to inertial space. As with the attitude determination, the difficulty is not in estimating an angular velocity, but in estimating it accurately enough to satisfy requirements. In the future, satellites will be required to perform these functions at more stringent performance requirement levels (measured by such metrics as time to acquire attitude and angular velocity estimates and the accuracies of the estimates) than are generally required today.

In the past, to meet even the near term performance requirements for attitude determination under adverse conditions, satellites have required additional spacecraft sensors (such as spinning earth sensors), and intense ground processing of telemetered data.

What is needed is a system and method for refining inaccurate satellite attitude and angular velocity estimates under demanding circumstances without the use of sensors beyond gyro and star trackers (which are used for normal mode attitude estimation and control) and without ground support. The present invention satisfies that need.

SUMMARY OF THE INVENTION

To address the requirements described above, the present invention discloses a method, apparatus for refining a spacecraft attitude estimate. The method comprises the steps of determining observed star positions $$_{obs}^{ST}\vec{s}(t_i)$$

in a first reference frame, ST, fixed with respect to a star sensor reference frame, for a plurality of stars observed at times $t_i$ for i=1, 2, ..., N; converting the observed star positions $$_{obs}^{ST}\vec{s}(t_i)$$

in the first reference frame ST, for a plurality of stars observed at times $t_i$ for i=1, 2, ..., N into observed star positions $$_{obs}^{b}\vec{s}(t_i)$$

in a second reference frame, b, fixed with respect to a spacecraft body reference frame, for the plurality of stars observed at times ti for i=1, 2, ..., N; determining an estimated spacecraft angular velocity, $^{est}\vec{\omega}$, at times $t_i$ for i=1, 2, ..., N; determining, through identification of the plurality of stars as corresponding to entries in a star database, the star positions $^{inertial}\vec{s}_i$ with respect to an inertial reference frame inertial, for i=1, 2, ..., N; predicting star positions $$_{pred}^{b}\vec{s}(t_i),$$

with respect to the second reference frame b, for the plurality of stars observed at times $t_i$ for i=1, 2, ..., N, from the star positions in the inertial reference frame $^{inertial}\vec{s}_i$, estimated spacecraft angular velocity $^{est}\vec{\omega}$ and an estimated spacecraft attitude $^{est}q_{b\_inertial}(t_a)$, applicable at time $t_a$; determining residuals $$_{res}^{b}\vec{s}(t_i)$$

in the second reference frame b for the plurality of stars observed at times $t_i$ for i=1, 2, ..., N, from a difference between the predicted star positions in the second reference frame $_{pred}^{b}\vec{s}(t_i)$ and the observed star positions in the second reference frame $_{obs}^{b}\vec{s}(t_i)$;

determining N equations for differences between the refined star positions $_{refined}^{b}\vec{s}(t_i)$ in the second reference frame b and observed star positions $_{obs}^{b}\vec{s}(t_i)$ in the second reference frame b at times $t_i$ for i=1, 2, ..., N as a function of the residuals in the second reference frame $_{res}^{b}\vec{s}(t_i)$ for the plurality of stars observed at times $t_i$ for i=1, 2, ..., N, and a refined satellite state estimate; and determining the refined satellite state estimate to minimize the differences between the refined star positions in the second reference frame $_{refined}^{b}\vec{s}(t_i)$ and observed star positions in the second reference frame $_{obs}^{b}\vec{s}(t_i)$ at times $t_i$ for i=1, 2, ..., N from the N equations.

The present invention is also embodied in an apparatus for refining a spacecraft state estimate. The apparatus comprises one or more star sensors, a navigation subsystem, a predictor module, a differencer, an equation formulator, and an equation solver. The star sensor(s) determine observed star positions $_{obs}^{ST}\vec{s}(t_i)$ in a first reference frame, ST, fixed with respect to a star sensor reference frame, for a plurality of stars observed at times $t_i$ for i=1, 2, ..., N. The navigation subsystem converts the observed star positions $_{obs}^{ST}\vec{s}(t_i)$ in the first reference frame ST, for a plurality of stars observed at times $t_i$ for i=1, 2, ..., N into observed star positions $_{obs}^{b}\vec{s}(t_i)$ in a second reference frame, b, fixed with respect to a spacecraft body reference frame, for the plurality of stars observed at times $t_i$ for i=1, 2, ..., N, determines an estimated spacecraft angular velocity, $^{est}\vec{\omega}$, at times $t_i$ for i=1, 2, ..., N; and determines, through identification of the plurality of stars as corresponding to entries in a star database, the star positions $^{inertial}\vec{s}_i$ with respect to an inertial reference frame inertial, for i=1, 2, ..., N. The predictor module predicts star positions $_{pred}^{b}\vec{s}(t_i)$, with respect to the second reference frame b, for the plurality of stars observed at times $t_i$ for i=1, 2, ..., N. from the star positions in the inertial reference frame $^{inertial}\vec{s}_i$, estimated spacecraft angular velocity $^{est}\vec{\omega}$ and an estimated spacecraft attitude $^{est}q_{b\_inertial}(t_a)$, applicable at time $t_a$. The differencer determines residuals $_{res}^{b}\vec{s}(t_i)$ in the second reference frame b for the plurality of stars observed at times $t_i$ for i=1, 2, ..., N, from a difference between the predicted star positions in the second reference frame $_{pred}^{b}\vec{s}(t_i)$ and the observed star positions in the second reference frame $_{obs}^{b}\vec{s}(t_i)$.

The equation formulator determines N equations for differences between the refined star positions $_{refined}^{b}\vec{s}(t_i)$ in the second reference frame b and observed star positions $$^b\vec{s}(t_i)_{obs}$$

in the second reference frame b at times $t_i$ for i=1, 2, ..., N as a function of the residuals in the second reference frame $$^b\vec{s}(t_i)_{res}$$

for the plurality of stars observed at times $t_i$ for i=1, 2, ..., N, and a refined satellite state estimate. Finally, the solver determines the refined satellite state estimate to minimize the differences between the refined star positions in the second reference frame $$^b\vec{s}(t_i)_{refined}$$

and observed star positions in the second reference frame $$^b\vec{s}(t_i)_{obs}$$

at times $t_i$ for i=1, 2, ..., N from the N equations.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
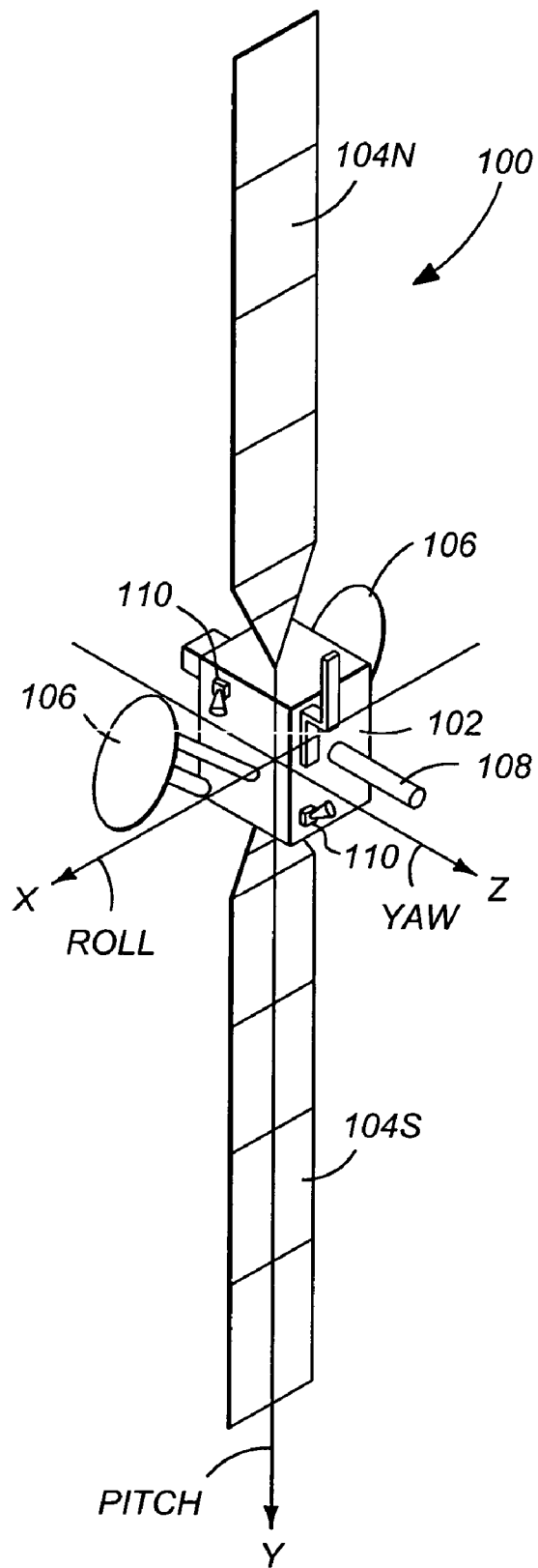
FIG. 1 is a diagram of a satellite.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omnidirectional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 10 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
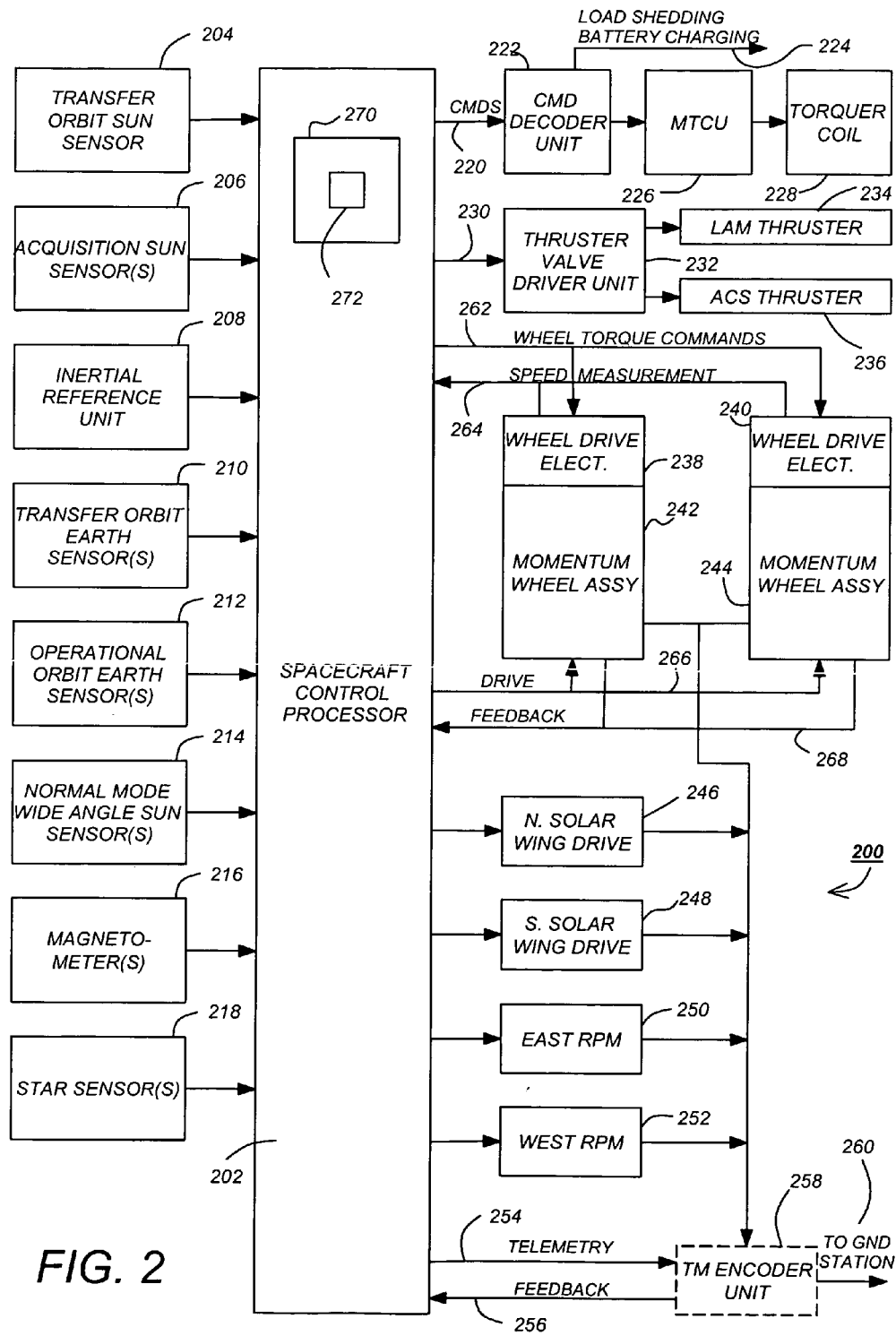
FIG. 2 is a diagram of an exemplary satellite attitude control system.

FIG. 2 is a diagram depicting the functional architecture of a representative attitude control system 200. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal mode. The normal mode control could include attitude estimation, attitude and solar array steering, momentum bias control, magnetic torquing, and thruster momentum dumping (H-dumping). The mechanism's mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218. Ground commands are also input into the spacecraft control processor. These commands determine the control functions of the processor and the scan patterns of some instruments and sensors.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thruster 234 and the attitude control thrusters 236.

Generally, the spacecraft 100 may use thrusters, momentum/reaction wheels, or a combination thereof to perform spacecraft 100 attitude control.

Wheel torque commands 262 are generated by the SCP 202 and are communicated to the wheel speed electronics 238 and 240. These effect changes in the wheel speeds for wheels in momentum/reaction wheel assemblies 242 and 244, respectively. The speed of the wheels is also measured and fed back to the SCP 202 by feedback control signal 264.

When momentum wheel assemblies are used, the spacecraft control processor also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260. The spacecraft typically includes 4 reaction wheels, disposed to permit that application of torques in any direction, and permitting for a backup torque wheel, however, different number of momentum wheels and momentum wheels of other design may be used. For the sake of simplification, the momentum wheel(s) will be alternatively referred to as momentum wheel(s) 242 hereinafter.

For some satellites, the spacecraft control processor 202 also commands the scan motions of various sensors and instruments. The scan timings and patterns generated by the SCP 202 are communicated to the scan motor drivers 278.

The SCP 202 also provides commands to the solar wing drives 246, 248, which manipulate solar wings 104N and 104S respectively. The solar wings 104N and 104S can be manipulated about the X axis and about the Y axis shown in FIG. 1. The SCP 202 can also step reflector positioning mechanisms (RPMs) 250 and 252 to adjust the antenna orientation. Modules 250 and 252 provide the mechanism positions to the TM encoder unit 258.

The SCP 202 also sends command signals 254 to the telemetry encoder unit 258 which in turn sends feedback signals 256 to the SCP 202. This feedback loop, as with the other feedback loops to the SCP 202 described earlier; assist in the overall control of the spacecraft. The SCP 202 communicates with the telemetry encoder unit 258, which receives the signals from various spacecraft components and subsystems indicating current operating conditions, and then relays them to the ground station 260.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Spacecraft Attitude Estimate and Angular Velocity Estimate Refinement

Figure 3A:
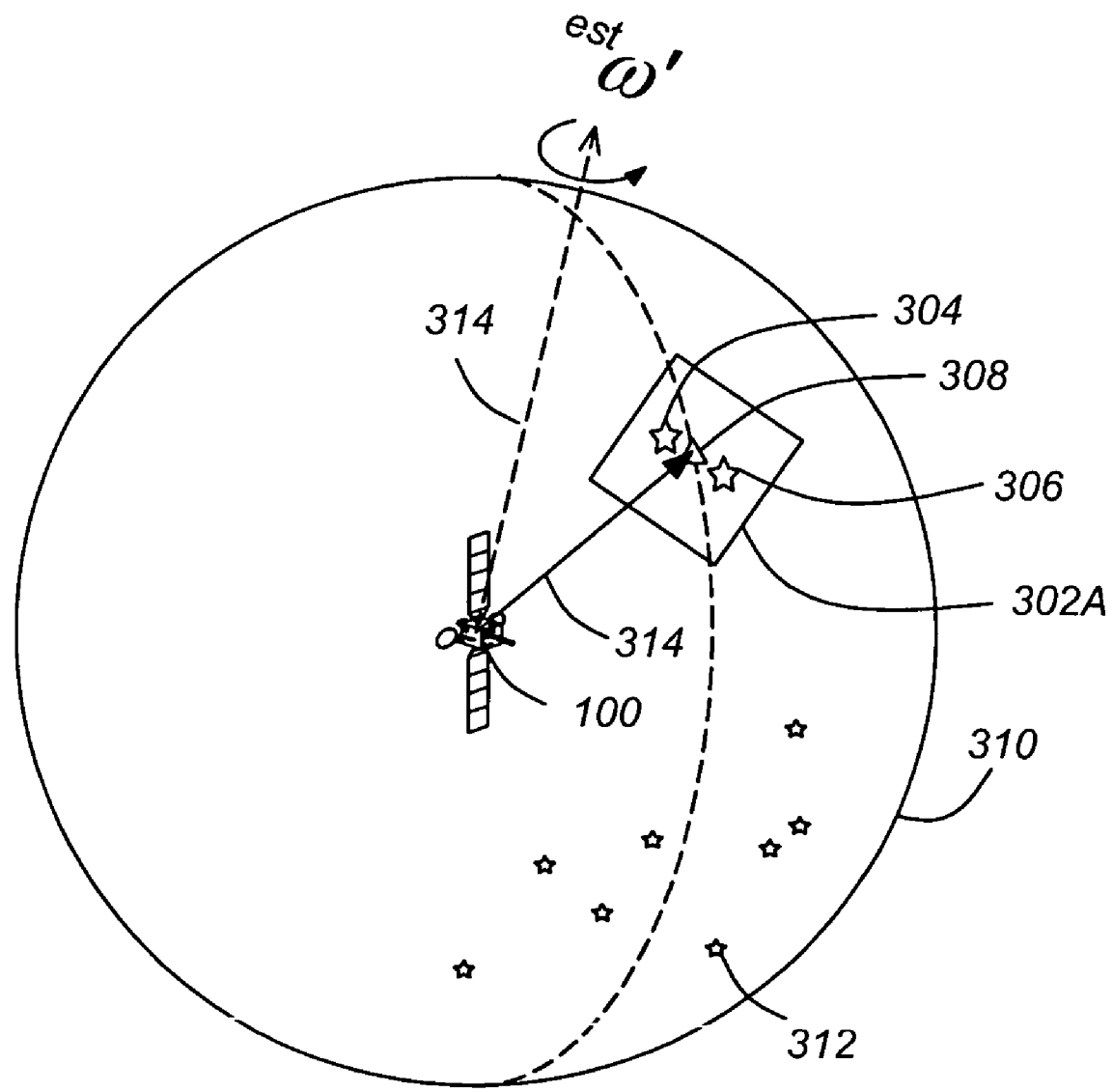
FIGS. 3A and 3B are diagrams illustrating the parameters used to refine spacecraft attitude and/or angular velocity estimates.

FIG. 3A is a diagram illustrating the parameters used to refine spacecraft attitude and angular velocity estimates. The spacecraft 100 comprises one or more star sensors (or "trackers") 218 that sense stars 312 with an apparent position on sphere 310 that are fixed in an inertial reference frame, inertial, but are not fixed with respect to the spacecraft 100 body reference frame. In one embodiment, the inertial reference frame used is the "Earth-Centered Inertial" (ECI) frame, described by the geocentric inertial coordinate system specified in "Spacecraft Attitude Determination and Control", edited by James R. Wertz, in Section 2.2, written by James R. Wertz (1978), and hereby incorporated by reference herein. The spacecraft 100 attitude is determined, based on the position of observed stars 312. A description of how attitude may be determined from star observations is described in U.S. Pat. No. 6,470,270, issued to David D. Needelman et al. on Oct. 22, 2002, which is hereby incorporated by reference herein.

Each star tracker 218 has a field of view 302A in which it can sense one or more stars. In the illustrated embodiment, multiple stars 304 and 306 are within the field of view 302A, and are tracked by the star tracker 218 at time $t_a$.

At time $t_a$, the spacecraft attitude, the mapping from the ECI reference frame to a reference frame (b), fixed with respect to the spacecraft body reference frame, is defined by $\vec{q}_{b\_eci}(t_a)$, which can be expressed as a direction cosine matrix, quaternion, or other analogous representations. For the mathematical derivations here, we shall assume a quaternion representation. Given a quaternion representation, $\vec{q}_{A\_B}$, representing a mapping between frames "A" and "B", and a vector, $^B\vec{v}$, defined with respect to frame "B", the equivalent vector, $^A\vec{v}$, defined with respect to frame "A", may be calculated as described in "Spacecraft Attitude Determination and Control", edited by James R. Wertz, in Appendix D, written by Lawrence Fallon, III, (1978) which is hereby incorporated by reference herein. We shall define this calculation using the operator "*"; e.g., in the case just described, $^A\vec{v} \equiv \vec{q}_{A\_B} *^B \vec{v}$. If a position is known in the ECI reference frame to be $^{eci}\vec{x}$, then $^b\vec{x}(t_a)$, the corresponding body reference frame position, at time $t_a$, may be calculated using $^b\vec{x}(t_a) = \vec{q}_{b\_eci}(t_a) *^{eci}\vec{x}$.

A star catalog and star tracker 218, or plurality of star trackers, can be used to produce a list of one or more identified stars, time-tagged at $t_i$, ($1 \leq i \leq N$) wherein the time $t_a$ is between $t_1$ and $t_N$ ($t_1 \leq t_a \leq t_N$). The identified stars are stars tracked by the star sensor(s) or tracker(s) 218, which have been identified as corresponding to stars listed in a star catalog (illustrated in FIG. 5, which is discussed below). The identification may be done in various ways, including that which is described in the aforementioned U.S. Pat. No. 6,470,270. The observed positions of the identified stars 304 and 306 can be described in a reference frame that is fixed with respect to the star tracker 218 reference frame $$\left( {}_{obs}^{ST}\vec{s}(t_i) \right)$$

and/or the ECI reference frame ($^{eci}\vec{s}_i$) (note that the ECI-referenced positions are time-independent). Knowledge of the orientation of the star tracker 218 with respect to spacecraft 100 body frame (b) allows calculation of the observed positions of the identified stars 304 and 306 in the spacecraft 100 body reference frame $$\left( {}_{obs}^{b}\vec{s}(t_i) \right).$$

The satellite's navigation system, as implemented by the attitude control system 200, provides an estimate of the angular velocity et of the spacecraft 100 about an axis 314 with respect to an inertial reference frame. This value can be expressed in the spacecraft 100 body reference frame, and is assumed to remain substantially constant over the time frame of interest. The satellite's navigation system, as implemented by the attitude control system 200, also provides $^{est}\vec{q}_{b\_eci}(t_a)$, an estimate of the spacecraft attitude at specified time $t_a$.

Figure 3B:
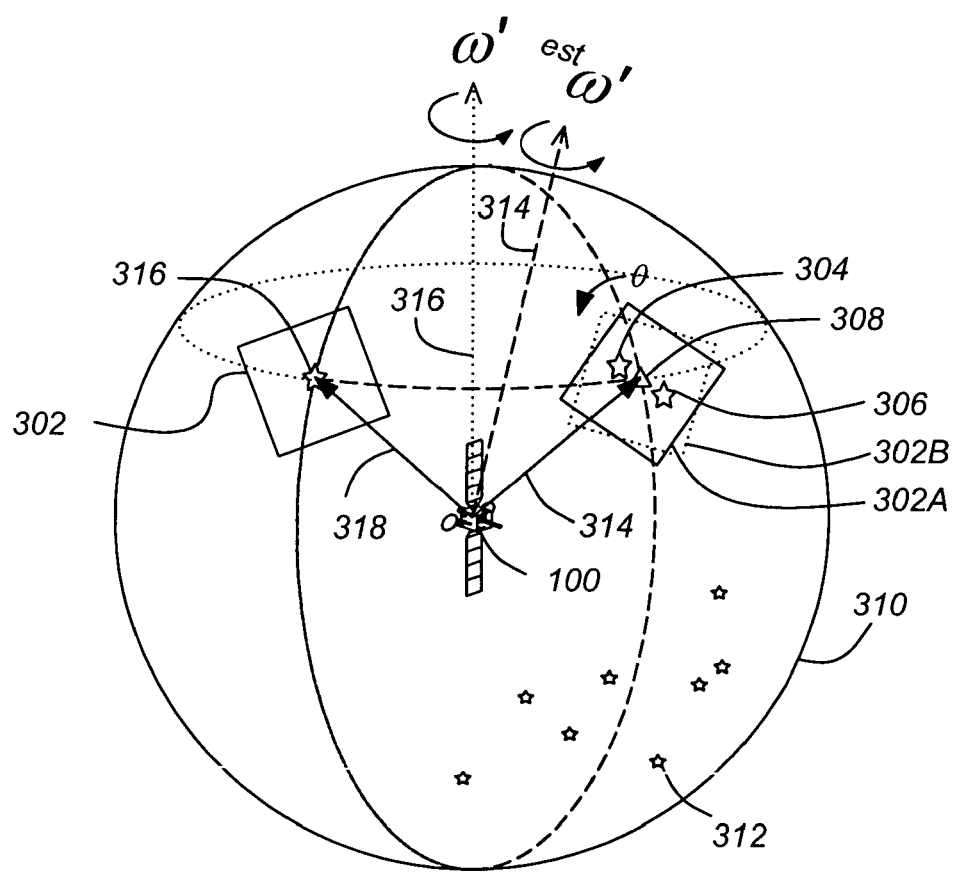

FIG. 3B is a diagram further depicting the parameters used in the attitude and angular velocity estimate refinement. Due to angular rotation of the satellite 100, the star tracker 218 is now tracking star 316 within FOV 302. The values for $^{eci}\vec{s}_i$ ($1 \leq i \leq N$), $^{est}\vec{q}_{b\_eci}(t_a)$ and $^{est}\vec{\omega}$ can be used to generate $$_{pred}^{b}\vec{s}(t_i),$$

predicted values for $^{b}\vec{s}(t_i)$, the star positions with respect to the spacecraft 100 body frame, at times $t_i$ for $i=1, 2, \ldots, N$. The error in the attitude and angular velocity estimates will be represented in the residuals, that is, the calculated differences between $$_{pred}^{b}\vec{s}(t_i) \text{ and } _{obs}^{b}\vec{s}(t_i).$$

The residuals can then be used to prepare a revised angular velocity estimate, and a revised attitude estimate, applicable at time $t_a$.

Based on the assumptions described below, a refinement of the angular velocity and attitude estimates may be calculated. First, it is assumed that the spacecraft 100 moves at a constant angular velocity $\vec{\omega}=|\vec{\omega}|\vec{\lambda}$ between times $t_1$ and $t_N$, where $|\vec{\omega}|$ is the angular rate, and $\vec{\lambda}$ is a unit vector defined with respect to the spacecraft body reference frame b. It is also assumed that at time $t_i$, the body fixed point. $^{b}s(t_i)$ (which is an observed star, reported by the star tracker 218 and expressed in the spacecraft body reference frame b) is known to correspond to the ECI-position $^{eci}\vec{s}_i$ (the corresponding catalog position of the identified star). It is further assumed that at time $t_a$ ($t_1 \leq t \leq t_N$), the spacecraft attitude is $\vec{q}_{b\_eci}(t_a)$, so the body-referenced point corresponding to $^{eci}\vec{s}_i$ is:

$$^{b}\vec{s}(t_a) \equiv \vec{q}_{b\_eci}(t_a) * {}^{eci}\vec{s}_i.$$

With these assumptions, at time $t_i$, the (observed) body-fixed position $^{b}\vec{s}(t_i)$, and the (deduced) body-fixed position, $^{b}\vec{s}(t_a)$, will satisfy the relationship described in Equation (1) below:

$$^{b}\vec{s}(t_i) = {}^{b}\vec{s}(t_a)\cos\phi_i - ({}^{b}\vec{s}(t_a) \times \vec{\lambda})\sin\phi_i + ({}^{b}\vec{s}(t_a) \cdot \vec{\lambda})(1 - \cos\phi_i) \quad \text{Eq. (1)}$$

where $\phi_i = |\vec{\omega}|(t_a - t_i)$.

Equation (1) can be found in "Spacecraft Dynamics," by T. R. Kane, P. W. Likins, and D. A. Levinson, (New York: McGraw-Hill, 1983), which is hereby incorporated by reference herein.

Equation (1) makes use of the positions $^{b}\vec{s}(t_i)$ and $^{b}\vec{s}(t_a)$, actual spacecraft attitude at time $t_a$, $\vec{q}_{b\_eci}(t_a)$, and the spacecraft angular velocity, $\vec{\omega}=|\vec{\omega}|\vec{\lambda}$, none of which are known.

Based on the known, estimated attitude at time $t_a$, $^{est}\vec{q}_{b\_eci}(t_a)$, and on the known. identified star position with respect to the ECI frame, $^{eci}\vec{s}_i$, a crude estimate for $^{b}\vec{s}(t_a)$, identified star position at time $t_a$, defined with respect to the spacecraft body frame can be formulated, which we shall refer to as $$^{est}[^{b}\vec{s}(t_a)]$$

as follows:

$$^{est}[^{b}\vec{s}(t_a)] \equiv {}^{est}\vec{q}_{b\_eci}(t_a) * {}^{eci}\vec{s}_i$$

Based on the known, estimated attitude at time $t_a$, $^{est}\vec{q}_{b\_eci}(t_a)$, and known, estimated angular velocity, $^{est}\vec{\omega} = |^{est}\vec{\omega}|^{est}\vec{\lambda}$, a crude prediction for $^{b}\vec{s}(t_i)$, identified star position at time $t_i$, defined with respect to the spacecraft body frame can be formulated. We shall refer to this prediction as $$_{pred}^{b}\vec{s}(t_i):$$

$$_{pred}^{b}\vec{s}(t_i) = {}^{est}[^{b}\vec{s}(t_a)]\cos(^{est}\phi_i) - \left( {}^{est}[^{b}\vec{s}(t_a)] \times {}^{est}\vec{\lambda} \right)\sin(^{est}\phi_i) + \left( {}^{est}[^{b}\vec{s}(t_a)] \cdot {}^{est}\vec{\lambda} \right)(1 - \cos(^{est}\phi_i))^{est}\vec{\lambda} \quad \text{Eq. (2)}$$

where $^{est}\phi_i = |^{est}\vec{\omega}|(t_a - t_i)$. Using this crude estimate of star position, a "residual" for each individual star can be defined as follows:

$$^b\vec{s}_{res}(t_i) \equiv {}^b\vec{s}_{pred}(t_i) - {}^b\vec{s}_{obs}(t_i)$$

The residual indicates the error in the attitude and angular velocity estimates. If there is no error, if the star position is perfectly measured by the star sensor or star tracker, and if $\vec{q}_{b\_eci}(t_a) = {}^{est}\vec{q}_{b\_eci}(t_a)$ and $\vec{\omega} = {}^{est}\vec{\omega}$, the residual will be zero.

As the residual will not, in general, be zero, a refinement of the attitude and/or angular velocity estimate may be made. The refinement(s) are such that predictions of identified star positions, made using the refined attitude and angular velocity estimates, closely match the observed star positions (noise in the observations makes a perfect match impossible). To refine the attitude estimate, an attitude refinement, $\Delta \vec{q}$, is defined such that the true attitude at time $t_a$, $\vec{q}_{b\_eci}(t_a)$, may be expressed as $$\vec{q}_{b\_eci}(t_a) = {}^{est}\vec{q}_{b\_eci}(t_a) \cdot \Delta\vec{q}.$$

Should it be desired to refine the angular velocity estimate, we define an angular rate refinement, $\Delta\omega$, and an angular velocity orientation refinement vector, $\Delta\vec{\lambda}$, from the proposition that the true angular velocity, $\vec{\omega}$, may be expressed as follows:

$$\vec{\omega} \equiv (|{}^{est}\vec{\omega}| + \Delta\omega) \cdot [{}^{est}\vec{\lambda} + \Delta\vec{\lambda}].$$

If it is further assumed that the refinements are relatively small; that is, $\Delta\vec{q}$ represents a rotation through an angle much less than the one radian, $\Delta\omega << {}^{est}\vec{\omega}$, and $|\Delta\vec{\lambda}| << 1$. From Equation (1), and using the refinements just defined, we can write an equation predicting, $$^b\vec{s}_{refined}(t_i)$$

the position of the identified star at time $t_i$) as follows:

$$^b\vec{s}_{refined}(t_i) = {}^b\vec{s}_{pred}(t_i) + \Delta\vec{q} *{}^{est}[{}^b\vec{s}(t_\alpha)] + \qquad \text{Eq. (3)}$$
$$\Delta\omega \cdot (t_i - t_\alpha)\left[{}^{est}[{}^b\vec{s}(t_\alpha)]\sin({}^{est}\phi_i) + ({}^{est}[{}^b\vec{s}(t_\alpha)] \times {}^{est}\vec{\lambda})\cos({}^{est}\phi_i) - \right.$$
$$\left. ({}^{est}[{}^b\vec{s}(t_\alpha)] \cdot {}^{est}\vec{\lambda})\sin({}^{est}\phi_i){}^{est}\vec{\lambda}\right] + \left[\sin({}^{est}\phi_i)({}^{est}[{}^b\vec{s}(t_\alpha)] \times) + \right.$$
$$\left. (1 - \cos({}^{est}\phi_i))\{{}^{est}\vec{\lambda}({}^{est}[{}^b\vec{s}(t_\alpha)] \cdot) + ({}^{est}[{}^b\vec{s}(t_\alpha)] \cdot {}^{est}\vec{\lambda})\}\right]\Delta\vec{\lambda}$$

Subtracting the observed star positions, $$^b\vec{s}_{obs}(t_i),$$

from both sides of the above equation, we obtain:

$$^b\vec{s}_{refined}(t_i) - {}^b\vec{s}_{obs}(t_i) = {}^b\vec{s}_{res}(t_i) + \Delta\vec{q} *{}^{est}[{}^b\vec{s}(t_\alpha)] + \qquad \text{Eq. (4)}$$
$$\Delta\omega \cdot (t_i - t_\alpha)\left[{}^{est}[{}^b\vec{s}(t_\alpha)]\sin({}^{est}\phi_i) + ({}^{est}[{}^b\vec{s}(t_\alpha)] \times {}^{est}\vec{\lambda})\cos({}^{est}\phi_i) - \right.$$
$$\left. ({}^{est}[{}^b\vec{s}(t_\alpha)] \cdot {}^{est}\vec{\lambda})\sin({}^{est}\phi_i){}^{est}\vec{\lambda}\right] +$$
$$\left[\sin({}^{est}\phi_i)({}^{est}[{}^b\vec{s}(t_\alpha)] \times) + (1 - \cos({}^{est}\phi_i))\right.$$
$$\left.\{{}^{est}\vec{\lambda}({}^{est}[{}^b\vec{s}(t_\alpha)] \cdot) + ({}^{est}[{}^b\vec{s}(t_\alpha)] \cdot {}^{est}\vec{\lambda})\}\right]\Delta\vec{\lambda}$$

Since the refined positions of the identified stars should match the observed positions of the identified stars, the left-hand side of Eq. (4) should be zero. Hence, Equation (4) becomes:

$$0 = {}^b\vec{s}_{res}(t_i) + \Delta\vec{q} *{}^{est}[{}^b\vec{s}(t_\alpha)] + \qquad \text{Eq. (5)}$$
$$\Delta\omega \cdot (t_i - t_\alpha)\left[{}^{est}[{}^b\vec{s}(t_\alpha)]\sin({}^{est}\phi_i) + ({}^{est}[{}^b\vec{s}(t_\alpha)] \times {}^{est}\vec{\lambda})\cos({}^{est}\phi_i) - \right.$$
$$\left. ({}^{est}[{}^b\vec{s}(t_\alpha)] \cdot {}^{est}\vec{\lambda})\sin({}^{est}\phi_i){}^{est}\vec{\lambda}\right] + \left[\sin({}^{est}\phi_i)({}^{est}[{}^b\vec{s}(t_\alpha)] \times) + \right.$$
$$\left. (1 - \cos({}^{est}\phi_i))\{{}^{est}\vec{\lambda}({}^{est}[{}^b\vec{s}(t_\alpha)] \cdot) + ({}^{est}[{}^b\vec{s}(t_\alpha)] \cdot {}^{est}\vec{\lambda})\}\right]\Delta\vec{\lambda}$$

The refinement of the spacecraft attitude and angular velocity becomes a computation of the optimal values of $\Delta\vec{q}$, $\Delta\omega$, and $\Delta\vec{\lambda}$ in order to closest satisfy Eq. (5) for the N equations (since i=1, 2, ..., N).

To refine only the attitude estimate, $\Delta\omega$ and $\Delta\vec{\omega}$ may be arbitrarily set to zero, so the optimal value of $\Delta\vec{q}$ may be calculated. Similarly, to refine only the angular velocity estimate, $\Delta\vec{q}$ may be set to the identity, so the optimal values for $\Delta\omega$ and $\Delta\vec{\lambda}$ may be calculated.

Figure 4:
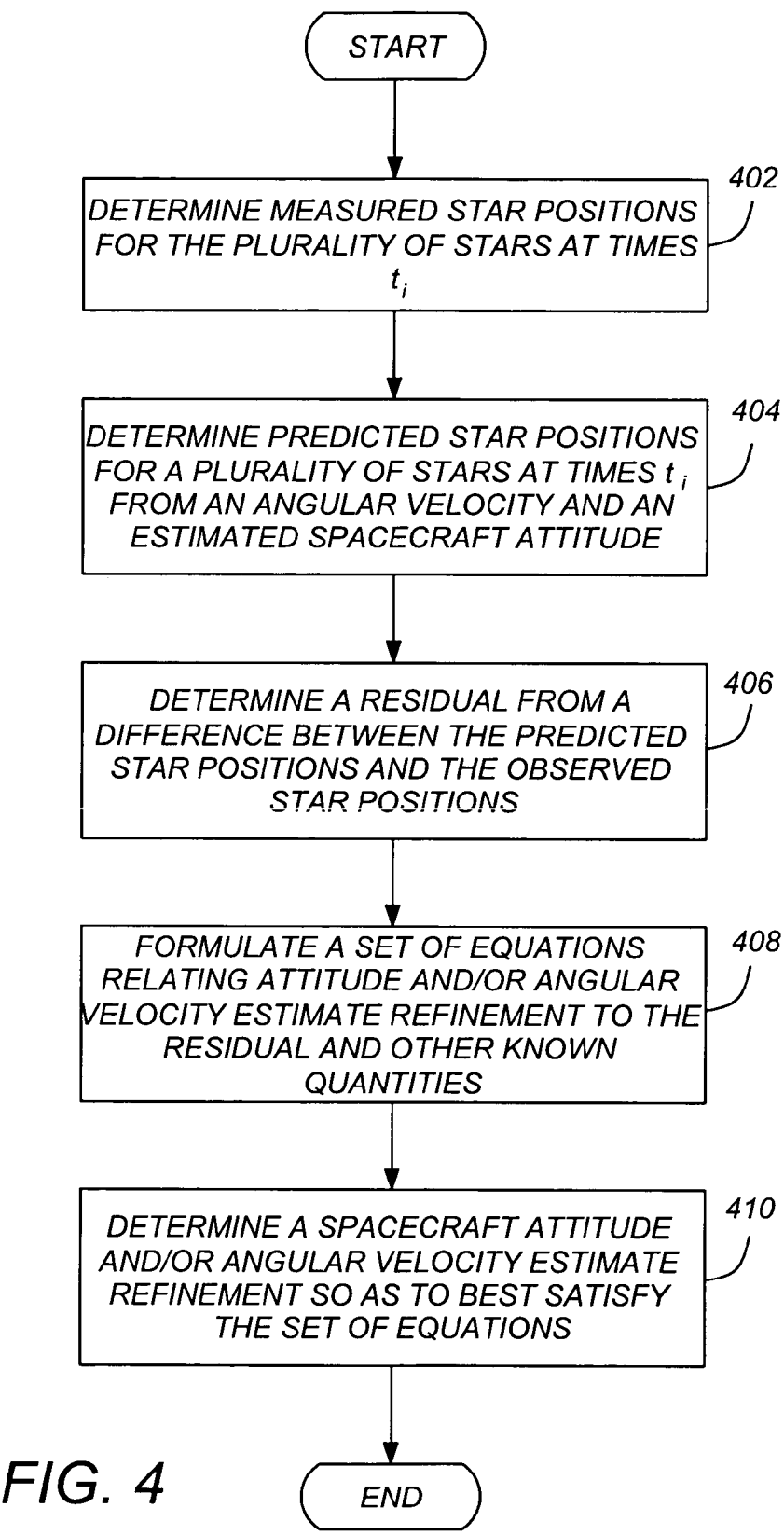
FIG. 4 is a diagram illustrating exemplary process steps that can be used to practice one embodiment of the present invention.

FIG. 4 is a diagram illustrating exemplary method steps that can be used to practice one embodiment of the present invention. FIG. 4 will be discussed with reference to FIG. 5, which prevents one embodiment of a system that can be used to refine spacecraft angular velocity and attitude estimates.

Figure 5:
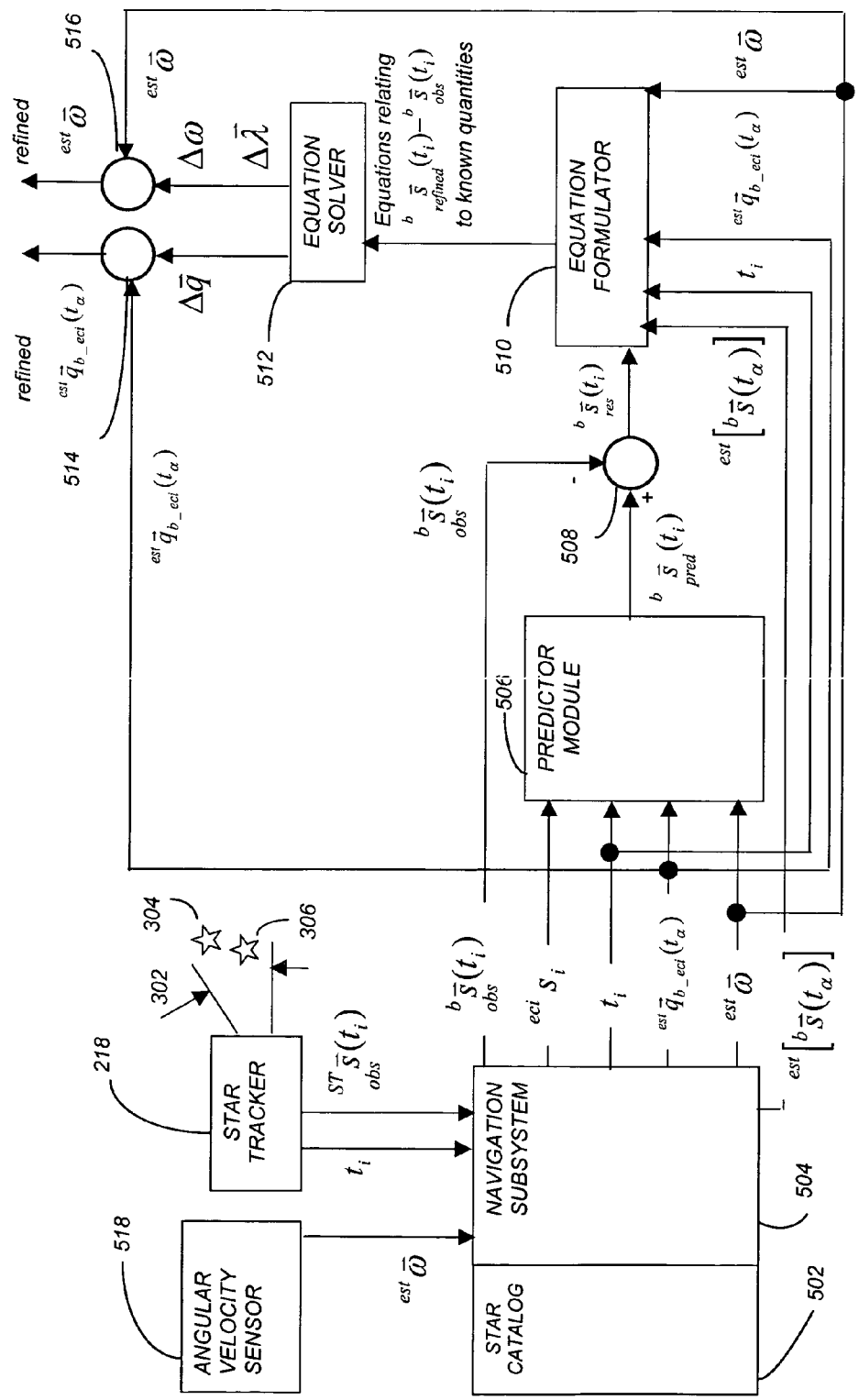
FIG. 5 is a diagram presenting an embodiment of a system that can be used to refine spacecraft angular velocity and attitude estimates.

Measured star positions are determined for a plurality of stars at times $t_i$, as shown in block 402. This may be accomplished as follows. Referring to FIG. 5, observed star positions $$^{ST}\vec{s}_{obs}(t_i)$$

are determined for a plurality of stars observed at times $t_i$ for i=1, 2, ..., N. These observed star positions are preferably determined in a the star sensor reference frame (ST), but can be determined in any reference frame fixed or referenceable to the star sensor reference frame. These are supplied to a navigation subsystem 504 along with an estimated spacecraft angular velocity $^{est}\vec{\omega}$ from an angular velocity sensor 518 such as a gyro. By identifying the plurality of observed stars (e.g. by correspondence to entries in a star catalog or database 502, the positions of the observed stars are determined with respect to an inertial reference frame. This can be accomplished, for example, by transforming star position measurements or observations from the star tracker 218 to spacecraft 100 body-referenced equivalent positions, $$^b\vec{s}_{obs}(t_i),$$

using the known alignments of the star sensors or trackers with respect to the spacecraft 100 body.

Predicted star positions for a plurality of stars are at times $t_i$ are determined from an estimated spacecraft angular velocity and an estimated spacecraft attitude, as shown in block 404 of FIG. 4. In one embodiment, this is performed by the predictor module 506 using the navigation subsystem 504 output including the times $t_i$; the corresponding positions of the stars with respect to the ECI frame as listed in a star catalog or database 502, $^{eci}\vec{s}_i$; an estimated spacecraft angular velocity $^{esi}\vec{\omega}$ from an angular velocity sensor 518; and an estimated spacecraft attitude at time $t_a$, $^{est}\vec{q}_{b\_eci}(t_a)$.

A residuals $$^b\vec{s}_{res}(t_i)$$

between the predicted star positions $$^b\vec{s}_{pred}(t_i)$$

and the observed star positions $$^b\vec{s}_{obs}(t_i)$$

are then determined as shown in block 406. This can be accomplished by simple subtraction, as represented by differencer 508.

As shown in block 510, equations are generated, such as the aforementioned Equation (4) for i=1, 2, . . . , N. expressing the difference between a refined star position estimate and the (observed) position measurements, $$[^b\vec{s}_{refined}(t_i) - {}^b\vec{s}_{obs}(t_i)],$$

as a function of attitude and/or angular velocity refinement, and known quantities. A spacecraft attitude refinement including an attitude refinement $\Delta\vec{q}$ and/or an angular velocity refinement (composed of an angular rate refinement, $\Delta\omega$, and an angular velocity orientation refinement, $\Delta\vec{\lambda}$) is determined, as shown in block 512. This can be accomplished using well known least squares or other linear programming and estimation techniques, wherein the refined values $\Delta\vec{q}$ and/or $\Delta\omega$ and $\Delta\vec{\lambda}$, are chosen to minimize the quantities $$[^b\vec{s}_{refined}(t_i) - {}^b\vec{s}_{obs}(t_i)],$$

for i=1, 2, . . . , N, as defined by block 510. The refined values $\Delta\vec{q}$, and/or $\Delta\omega$ and $\Delta\vec{\lambda}$, are then combined with the estimated values $^{est}\vec{\omega}$ and $^{est}\vec{q}_{b\_eci}(t_a)$, as shown in blocks 514 and 516, to arrive at an improved attitude and/or angular velocity estimate.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of refining a spacecraft state estimate, comprising the steps of:

determining observed star positions $$^{ST}\vec{s}_{obs}(t_i)$$

in a first reference frame, ST, fixed with respect to a star sensor reference frame, for a plurality of stars observed at times $t_i$ for i=1, 2, . . . , N;

converting the observed star positions $$^{ST}\vec{s}_{obs}(t_i)$$

in the first reference frame ST, for a plurality of stars observed at times $t_i$ for i=1, 2, . . . , N into observed star positions $$^b\vec{s}_{obs}(t_i)$$

in a second reference frame, b, fixed with respect to a spacecraft body reference frame, for the plurality of stars observed at times $t_i$ for i=1, 2, . . . , N;

determining an estimated spacecraft angular velocity, $^{est}\vec{\omega}$, at times $t_i$ for i=1, 2, . . . , N;

determining, through identification of the plurality of stars as corresponding to entries in a star database, the star positions $^{inertial}\vec{s}_i$ with respect to an inertial reference frame inertial, for i=1, 2, ..., N;

predicting star positions $$^b\vec{s}_{pred}(t_i),$$

with respect to the second reference frame b, for the plurality of stars observed at times $t_i$ for i=1, 2, ..., N, from the star positions in the inertial reference frame $^{inertial}\vec{s}_i$, estimated spacecraft angular velocity $^{est}\vec{\omega}$ and an estimated spacecraft attitude $^{est}q_{b\_inertial}(t_a)$, applicable at time $t_a$;

determining residuals $$^b\vec{s}_{res}(t_i)$$

in the second reference frame b for the plurality of stars observed at times $t_i$ for i=1, 2, ..., N, from a difference between the predicted star positions in the second reference frame $$^b\vec{s}_{pred}(t_i)$$

and the observed star positions in the second reference frame $$^b\vec{s}_{obs}(t_i);$$

determining N equations for differences between the refined star positions $$^b\vec{s}_{refined}(t_i)$$

in the second reference frame b and observed star positions $$^b\vec{s}_{obs}(t_i)$$

in the second reference frame b at times $t_i$ for i=1, 2, ..., N as a function of the residuals in the second reference frame $$^b\vec{s}_{res}(t_i)$$

for the plurality of stars observed at times $t_i$ for i=1, 2, ..., N, and a refined spacecraft state estimate; and determining the refined spacecraft state estimate to minimize the differences between the refined star positions in the second reference frame $$^b\vec{s}_{refined}(t_i)$$

and observed star positions in the second reference frame $$^b\vec{s}_{obs}(t_i)$$

at times $t_i$ for i=1, 2, ..., N from the N equations.

2. The method of claim 1, wherein the step of determining N equations for differences between the refined star positions $$^b\vec{s}_{refined}(t_i)$$

in the second reference frame b and observed star positions $$^b\vec{s}_{obs}(t_i)$$

in the second reference frame b at times $t_i$ for i=1, 2, ..., N as a function of the residuals $$^b\vec{s}_{res}(t_i)$$

in the second reference frame b for the plurality of stars observed at times $t_i$ for i=1, 2, ..., N, and the refined spacecraft state estimate comprises the steps of:

determining N intermediate equations for refined star positions $$^b\vec{s}_{refined}(t_i)$$

in the second reference frame b at times $t_i$ for i=1, 2, ..., N corresponding to the star positions $^{inertial}\vec{s}_i$, with respect to an inertial reference frame inertial, for i=1, 2, ..., N, as a function of the refined spacecraft state estimate, and the predicted star positions $$^b\vec{s}_{pred}(t_i)$$

of the plurality of stars in the second reference frame b at times $t_i$ for i=1, 2, ..., N; and determining the N equations from the N intermediate equations and the observed star positions $$^b\vec{s}_{obs}(t_i)$$

in the second reference frame b.

3. The method of claim 1, wherein the inertial reference frame is an earth centered inertial reference frame.

4. The method of claim 1, wherein the observed star positions in the first reference frame $$^{ST}\vec{s}_{obs}(t_i),$$

are converted into observed star positions in a second reference frame fixed with respect to a spacecraft body reference frame $$^{b}\vec{s}_{obs}(t_i)$$

for the plurality of stars at times $t_i$ for i=1, 2, ..., N via a mapping based on one or more star sensor alignments.

5. The method of claim 1, wherein the state estimate comprises a spacecraft attitude estimate and the refined spacecraft state estimate comprises a refined attitude estimate.

6. The method of claim 5, wherein the refined attitude estimate is computed from the estimated spacecraft attitude $^{est}\vec{q}_{b\_inertial}(t_a)$ adjusted by an attitude refinement.

7. The method of claim 1, wherein the state estimate comprises a spacecraft angular velocity estimate, and the refined spacecraft state estimate comprises a refined spacecraft angular velocity estimate.

8. The method of claim 7, wherein the refined spacecraft angular velocity estimate is computed from the estimated spacecraft angular velocity $^{est}\vec{\omega}$ adjusted by an angular velocity refinement.

9. The method of claim 1, wherein a representation of the estimated spacecraft attitude $^{est}\vec{q}_{b\_inertial}(t_a)$ comprises a quaternion.

10. The method of claim 1, wherein a representation of the estimated spacecraft attitude $^{est}\vec{q}_{b\_inertial}(t_a)$ comprises a direction cosine matrix.

11. The method of claim 1, wherein the step of determining observed star positions $$^{ST}\vec{s}_{obs}(t_i)$$

in a first reference frame, ST, fixed with respect to a star sensor reference frame, for a plurality of stars observed at times $t_i$ for i=1, 2, ..., N comprises the step of measuring the observed star positions with at least one star tracker.

12. An apparatus for refining a spacecraft state estimate, comprising:
a star sensor configured to determine for observed star positions $$^{ST}\vec{s}_{obs}(t_i)$$

in a first reference frame, ST, fixed with respect to a star sensor reference frame, for a plurality of stars observed at times $t_i$ for i=1, 2, ..., N;
a navigation subsystem configured to
convert the observed star positions $$^{ST}\vec{s}_{obs}(t_i)$$

in the first reference frame ST, for a plurality of stars observed at times $t_i$ for i=1, 2, ..., N into observed star positions $$^{b}\vec{s}_{obs}(t_i)$$

in a second reference frame, b, fixed with respect to a spacecraft body reference frame, for the plurality of stars observed at times $t_i$ for i=1, 2, ..., N;

determine an estimated spacecraft angular velocity, $^{est}\vec{\omega}$, at times $t_i$ for i=1, 2, ..., N; and for determine through identification of the plurality of stars as corresponding to entries in a star database, the star positions $^{inertial}\vec{s}_i$, with respect to an inertial reference frame inertial, for i=1, 2, ..., N;

a predictor module configured to predict star positions $$^{b}\vec{s}_{pred}(t_i),$$

with respect to the second reference frame b, for the plurality of stars observed at times $t_i$ for i=1, 2, ..., N, from the star positions in the inertial reference frame $^{inertial}\vec{s}_i$, estimated spacecraft angular velocity $^{est}\vec{\omega}$ and an estimated spacecraft attitude $^{est}\vec{q}_{b\_inertial}(t_a)$, applicable at time $t_a$;

a differencer configured to determine residuals $$^{b}\vec{s}_{res}(t_i)$$

in the second reference frame b for the plurality of stars observed at times $t_i$ for i=1, 2, ..., N, from a difference between the predicted star positions in the second reference frame $$^{b}\vec{s}_{pred}(t_i)$$

and the observed star positions in the second reference frame $$^{b}\vec{s}_{obs}(t_i);$$

an equation formulator configured to determine N equations for differences between the refined star positions $$^{b}\vec{s}_{refined}(t_i)$$

in the second reference frame b and observed star positions $${}^{b}\vec{s}(t_i)_{obs}$$

in the second reference frame b at times $t_i$ for i=1, 2, ..., N as a function of the residuals in the second reference frame $${}^{b}\vec{s}(t_i)_{res}$$

for the plurality of stars observed at times $t_i$ for i=1, 2, ..., N, and a refined spacecraft state estimate; and a solver configured to determine the refined spacecraft state estimate to minimize the differences between the refined star positions in the second reference frame $${}^{b}\vec{s}(t_i)_{refined}$$

and observed star positions in the second reference frame $${}^{b}\vec{s}(t_i)_{obs}$$

at times $t_i$ for i=1, 2, ..., N from the N equations.

13. The apparatus of claim 12, wherein the equation formulator determines N intermediate equations for refined star positions $${}^{b}\vec{s}(t_i)_{refined}$$

in the second reference frame b at times $t_i$ for i=1, 2, ..., N corresponding to the star positions ${}^{inertial}\vec{s}_i$ with respect to an inertial reference frame inertial, for i=1, 2, ..., N, as a function of the refined spacecraft state estimate, and the predicted star positions $$ {}^{b}\vec{s}(t_i)_{pred}$$

of the plurality of stars in the second reference frame b at times $t_i$ for i=1, 2, ... N, and determines the N equations from the N intermediate equations and the observed star positions $$ {}^{b}\vec{s}(t_i)_{obs}$$

in the second reference frame b.

14. The apparatus of claim 12, wherein the inertial reference frame is an earth centered inertial reference frame.

15. The apparatus of claim 12, wherein the observed star positions in the first reference frame $$ {}^{ST}\vec{s}(t_i)_{obs},$$

are converted into observed star positions in a second reference frame fixed with respect to a spacecraft body reference frame $$ {}^{b}\vec{s}(t_i)_{obs}$$

for the plurality of stars at times $t_i$ for i=1, 2, ..., N via a mapping based on one or more star sensor alignments.

16. The apparatus of claim 12, wherein the state estimate comprises a spacecraft attitude estimate and the refined spacecraft state estimate comprises a refined attitude estimate.

17. The apparatus of claim 16, wherein the refined attitude estimate is computed from the estimated spacecraft attitude ${}^{est}\vec{q}_{b\_inertial}(t_a)$ adjusted by an attitude refinement.

18. The apparatus of claim 12, wherein the state estimate comprises a spacecraft angular velocity estimate, and the refined spacecraft state estimate comprises a refined spacecraft angular velocity estimate.

19. The apparatus of claim 18, wherein the refined spacecraft angular velocity estimate is computed from the estimated spacecraft angular velocity ${}^{est}\vec{\omega}$ adjusted by an angular velocity refinement.

20. The apparatus of claim 12, wherein a representation of the estimated spacecraft attitude ${}^{est}\vec{q}_{b\_inertial}(t_a)$ comprises a quaternion.

21. The apparatus of claim 12, wherein a representation of the estimated spacecraft attitude ${}^{est}\vec{q}_{b\_inertial}(t_a)$ comprises a direction cosine matrix.

22. An apparatus for refining a spacecraft state estimate, comprising:

means for determining observed star positions $$ {}^{ST}\vec{s}(t_i)_{obs}$$

in a first reference frame, ST, fixed with respect to a star sensor reference frame, for a plurality of stars observed at times $t_i$ for i=1, 2, ..., N;

means for converting the observed star positions $$ {}^{ST}\vec{s}(t_i)_{obs}$$

in the first reference frame ST, for a plurality of stars observed at times $t_i$ for i=1, 2, ..., N into observed star positions $$ {}^{b}\vec{s}(t_i)_{obs}$$

in a second reference frame, b, fixed with respect to a spacecraft body reference frame, for the plurality of stars observed at times $t_i$ for i=1, 2, ..., N;

means for determining an estimated spacecraft angular velocity, $^{est}\vec{\omega}$, at times $t_i$ for i=1, 2, ..., N;

means for determining, through identification of the plurality of stars as corresponding to entries in a star database, the star positions $^{inertial}\vec{s}_i$, with respect to an inertial reference frame inertial, for i=1, 2, ..., N;

means for predicting star positions by $$^b\vec{s}_{pred}(t_i),$$

with respect to the second reference frame b, for the plurality of stars observed at times $t_i$ for i=1, 2, ..., N, from the star positions in the inertial reference frame $^{inertial}\vec{s}_i$, estimated spacecraft angular velocity est6 and an estimated spacecraft attitude $^{est}\vec{q}_{b\_inertial}(t_a)$, applicable at time $t_a$;

means for determining residuals $$^b\vec{s}_{res}(t_i)$$

in the second reference frame b for the plurality of stars observed at times $t_i$ for i=1, 2, ..., N, from a difference between the predicted star positions in the second reference frame $$^b\vec{s}_{pred}(t_i)$$

and the observed star positions in the second reference frame $$^b\vec{s}_{obs}(t_i);$$

means for determining N equations for differences between the refined star positions $$^b\vec{s}_{refined}(t_i)$$

in the second reference frame b and observed star positions $$^b\vec{s}_{obs}(t_i)$$

in the second reference frame b at times $t_i$ for i=1, 2, ..., N as a function of the residuals in the second reference frame $$^b\vec{s}_{res}(t_i)$$

for the plurality of stars observed at times $t_i$ for i=1, 2, ..., N, and a refined spacecraft state estimate; and means for determining the refined spacecraft state estimate to minimize the differences between the refined star positions in the second reference frame $$^b\vec{s}_{refined}(t_i)$$

and observed star positions in the second reference frame $$^b\vec{s}_{obs}(t_i)$$

at times $t_i$ for i=1, 2, ..., N from the N equations.

23. The apparatus of claim 22, wherein the means for determining N equations for differences between the refined star positions $$^b\vec{s}_{refined}(t_i)$$

in the second reference frame b and observed star positions $$^b\vec{s}_{obs}(t_i)$$

in the second reference frame b at times $t_i$ for i=1, 2, ..., N as a function of the residuals $$^b\vec{s}_{res}(t_i)$$

in the second reference frame b for the plurality of stars observed at times to for i=1, 2, ..., N, and the refined spacecraft state estimate comprises:

means for determining N intermediate equations for refined star positions $$^b\vec{s}_{refined}(t_i)$$

in the second reference frame b at times $t_i$ for i=1, 2, ..., N corresponding to the star positions $^{inertial}\vec{s}_i$, with respect to an inertial reference frame inertial, for i=1, 2, ..., N. as a function of the refined spacecraft state estimate, and the predicted star positions $$^b\vec{s}_{pred}(t_i)$$

of the plurality of stars in the second reference frame b at times $t_i$ for i=1, 2, ..., N; and means for determining the N equations from the N intermediate equations and the observed star positions $$^b\vec{s}_{obs}(t_i)$$

in the second reference frame b.

24. The apparatus of claim 22, wherein the inertial reference frame is an earth centered inertial reference frame.

25. The apparatus of claim 22, wherein the observed star positions in the first reference frame $$^{ST}_{obs}\vec{s}(t_i),$$

are converted into observed star positions in a second reference frame fixed with respect to a spacecraft body reference frame $^{b}_{obs}\vec{s}(t_i)$ for the plurality of stars at times $t_i$ for i=1, 2, . . . , N via a mapping based on one or more star sensor alignments.

26. The apparatus of claim 22, wherein the state estimate comprises a spacecraft attitude estimate and the refined spacecraft state estimate comprises a refined attitude estimate.

27. The apparatus of claim 26, wherein the refined attitude estimate is computed from the estimated spacecraft attitude $^{est}\vec{q}_{b\_inertial}(t_a)$ adjusted by an attitude refinement.

28. The apparatus of claim 22, wherein the state estimate comprises a spacecraft angular velocity estimate, and the refined spacecraft state estimate comprises a refined spacecraft angular velocity estimate.

29. The apparatus of claim 28, wherein the refined spacecraft angular velocity estimate is computed from the estimated spacecraft angular velocity $^{est}\vec{\omega}$ adjusted by an angular velocity refinement.

30. The apparatus of claim 22, wherein the representation of the estimated spacecraft attitude $^{est}\vec{q}_{b\_inertial}(t_a)$ comprises a quaternion.

31. The apparatus of claim 22, wherein a representation of the estimated spacecraft attitude $^{est}\vec{q}_{b\_inertial}(t_a)$ comprises a direction cosine matrix.

32. The apparatus of claim 22, wherein the step of determining observed star positions $$^{ST}_{obs}\vec{s}(t_i)$$

in a first reference frame, ST, fixed with respect to a star sensor reference frame, for a plurality of stars observed at times $t_i$ for i=1, 2, . . . , N comprises the step of measuring the observed star positions with at least one star tracker.

* * * * *